United States Patent [19]

Schmeichel et al.

[11] Patent Number: 4,703,971
[45] Date of Patent: Nov. 3, 1987

[54] TRUCK BOX EXTENSION APPARATUS

[76] Inventors: Steven C. Schmeichel, 1212 Tenth Ave. NE.; Charles M. Schmeichel, Rte. 3, both of Jamestown, N. Dak. 58401

[21] Appl. No.: 11,374

[22] Filed: Feb. 5, 1987

Related U.S. Application Data

[63] Continuation of Ser. No. 611,695, May 18, 1984, abandoned, which is a continuation-in-part of Ser. No. 399,454, Jul. 19, 1982, abandoned.

[51] Int. Cl.⁴ .............................................. B62D 33/08
[52] U.S. Cl. ........................................ 296/26; 296/10;
296/34; 296/36; 248/354.1; 254/243; 254/129
[58] Field of Search ...................... 296/26, 27, 10, 98,
296/34, 36, 99 R, 165, 159, 161, 172, 173, 176;
105/378; 135/107, 112; 248/351, 352, 354.1;
254/209, 243, 129

[56] References Cited

U.S. PATENT DOCUMENTS

| 856,159 | 6/1907 | Keller | 248/351 |
|---|---|---|---|
| 1,844,809 | 1/1930 | Spaugh | 254/129 |
| 2,766,008 | 1/1956 | Hurd | 254/129 |
| 2,797,124 | 6/1957 | Hauptli | 296/26 |
| 2,947,566 | 8/1960 | Tower | 296/10 |
| 3,009,212 | 11/1961 | Makens | 296/27 |
| 3,037,807 | 6/1962 | Hicks | 296/10 |
| 3,184,261 | 5/1965 | Young | 296/26 |
| 3,403,936 | 10/1968 | Young | 296/27 |
| 3,622,193 | 11/1971 | Schmidt | 296/27 |
| 3,924,889 | 12/1975 | Gogush | 296/26 |
| 3,957,068 | 5/1976 | Cox | 296/27 |
| 4,054,011 | 10/1977 | Ensink et al. | 296/26 |
| 4,095,838 | 6/1978 | Beeler | 296/26 |
| 4,269,443 | 5/1981 | Farmer | 296/36 |
| 4,302,043 | 11/1981 | Dimmer et al. | 296/98 |
| 4,544,196 | 12/1984 | Schmeichel et al. | 296/26 |

FOREIGN PATENT DOCUMENTS

| 1250772 | 10/1971 | United Kingdom | 296/26 |
|---|---|---|---|
| 1385118 | 2/1975 | United Kingdom | 296/26 |
| 2037673 | 7/1980 | United Kingdom | 296/27 |

Primary Examiner—Dennis H. Pedder
Attorney, Agent, or Firm—Merchant, Gould, Smith Edell, Welter & Schmidt

[57] ABSTRACT

An extension apparatus (110) for vehicles is disclosed. The extension apparatus (110) includes a frame assembly (111) having upper and lower frame members (112a, b) which are interconnected by a flexible member (116) attached at the lower and upper edges thereof to the lower and upper frame members (112a, b). The frame assembly is adjustable between raised and lowered positions. The extension apparatus further includes jack means (118) attached to the lower and upper frame members (112a, b) on a cargo bed side of the flexible member and pivotal about a horizontal axis parallel to the flexible member (116) for raising said upper frame member (112b) into the raised position. The frame assembly is suitably attached to the top of the sidewalls (20) of a cargo bed area. A stabilizing bar member (192) interconnects one of the upper frame members (112a) and one of the lower frame members (112b) on opposite sides of the frame assembly (111). Gas spring actuators (196) at the ends of the frame assembly (111) facilitate in raising the frame assembly (111).

13 Claims, 15 Drawing Figures

TRUCK BOX EXTENSION APPARATUS

This is a continuation of application Ser. No. 611,695, filed May 18, 1984, abandoned, which is a continuation-in-part of Ser. No. 399,454, filed July 19, 1982 abandoned.

TECHNICAL FIELD OF THE INVENTION

The present invention relates to an extension apparatus for a truck box or the like. More particularly, the present invention relates to an extension which attaches to the top of the sidewalls of an open cargo bed area or the like, the extension being raised or lowered as required without the necessity of removal from the truck body.

BACKGROUND OF THE INVENTION

Extension apparatus for trucks or the like which increase the volume and height of the cargo or bed portion of such a vehicle are known in the art. However, most extension apparatus require removal from the body of the vehicle when not in use and reattachment thereto when in use. This requires much time and effort and often necessitates the presence of special tools. In addition, the extension apparatus often will not be readily available when needed.

To overcome these and many other problems associated with removable extension apparatus, extension apparatus have been designed which remain permanently attached to the body of the truck thereby doing away with the necessity to remove the apparatus when not in use.

An example of such an extension apparatus can be found in U.S. Pat. No. 4,095,838 issued to Arnold Beeler on June 20, 1978. However, the Beeler patent has several problems associated therewith. For example, a flexible fabric is attached between two channel members which in turn are supported in an extended upright, spaced apart relationship by a plurality of horizontally spaced jack-knife support members. The jack-knife support members have a tendency to bind and twist unless the entire extension apparatus is raised substantially simultaneously. Additionally, the jack-knife members are positioned on the outside of the flexible fabric material such that the cargo of the truck box will push the fabric into the jack-knife members thereby causing wear of the fabric.

Furthermore, the positioning of the jack-knife members on the outside of the flexible fabric will often create problems in reaching the extension apparatus during the raising and lowering process. Indeed, it does not appear as though the jack-knife members can be positioned on the inside of the flexible fabric as they will interfere with the fabric material during the folding process when the extension apparatus is lowered.

Additionally, the rectangular open channel-like construction of the upper and lower frame members to which the jack-knife members are attached makes the frame-like members very susceptible to collecting debris such as grain, ice, etc. which might obstruct raising and lowering of the fabric extension.

Furthermore and very importantly, the Beeler extension apparatus does not appear to have the required strength and sturdiness characteristics needed to support such items as roll-up tarp apparatus which are used to enclose the cargo area.

The present invention solves these and many other problems associated with the prior art.

SUMMARY OF THE INVENTION

The present invention relates to an extension apparatus adaptable for mounting on top of the side walls of a vehicle's cargo bed area for increasing the volume thereof. The extension apparatus includes a frame assembly having an upper frame member and a lower frame member. The lower frame member is attached proximate the top of the cargo bed side wall. The frame assembly has a lowered and a raised position, the upper frame member resting on the lower frame member in the lowered position and the upper frame member being vertically spaced apart from the lower frame member in the raised position. The upper and lower frame members each have a channel extending longitudinally thereof. Actuator means interconnects the upper and lower frame members for aiding in raising the frame assembly into the raised position. A flexible material having upper and lower edges is slidably mounted in the channels of the lower and upper frame members for longitudinal movement of the lower and upper frame memberes. The flexible material is in a slack condition when the frame assembly is in the lowered position and is in a taut condition when the frame assembly is in the raised position. The flexible material has a first side facing the cargo bed area and a second side facing away from the cargo bed area. A plurality of horizontally spaced apart jack means cooperate with the upper and lower frame members to stretch the flexible material into the taut condition. The jack means are positioned on the first side of the flexible material. The jack means include a first elongated member having lower and upper ends and a second elongated member having lower and upper ends. The first elongated member is interconnected to the upper frame member for pivotal motion about a horizontal axis and the second elongated member is pivotally interconnected proximate the upper end thereof to the first elongated member intermediate of the lower end and upper ends of the first elongated member. The extension apparatus further includes means for removably retaining the lower end of the second elongated member proximate the lower frame member.

A particularly advantageous feature of the present invention is that the present invention need not be removed from the top of the cargo area sidewalls when not in use. This provides for an extension apparatus which is readily raised or extended so as to increase the volume and height of the cargo area as needed. Additionally, few special tools are required to raise or lower the extension apparatus. Furthermore, the structural features and design of the present invention make it easily extended into its operational raised position or folded down into its lowered storage position on the top of the cargo area sidewalls.

In one embodiment of the present invention, jack apparatus spaced apart from one another are utilized to raise the upper frame member above the lower frame member into the raised position. The jack apparatus assure uniform vertical tension throughout the flexible member.

Yet another advantageous feature of another embodiment of the present invention is the positioning of the jack apparatus on the inside of the flexible member such that the cargo in the cargo area pushes out on the flexible member. Consequently, the flexible member does not rub against the jack apparatus thereby reducing wear.

Furthermore, the present invention is constructed and arranged such that debris does not interfere with the raising and lowering of the present invention.

A most significant feature of the present invention is the ability of the flexible member in one embodiment to slide longitudinally of the frame members thereby enabling both uniform vertical tension and uniform horizontal tension which results in increased sturdiness. In addition to the uniform tension, the jack apparatus are positioned relatively close to the flexible member when in the extended position thus increasing further the over-all sturdiness of the extension apparatus of the present invention such that it will resist buffeting by the wind and can be utilized with roll-up tarp apparatus.

Furthermore, the present invention can be made of a light-weight material thereby increasing the vehicle's efficiency over conventional extension apparatus.

Yet another feature of one embodiment is the use of stabilizing members which extend transversely of the cargo bed area between the upper and lower frame members of the frame assembly on opposite sides of the cargo bed area. This reduces sway of the upper frame member and further holds the upper frame member in vertical alignment with the lower frame member.

Still another feature of one embodiment of the present invention is the presence of gas spring actuators extending between the upper and lower frame members to aid in raising the frame assembly. In addition, the gas spring actuators serve to support the upper frame member in a partially raised position which facilitates placement of the jack apparatus between the upper and lower frame members by the operator.

Still another feature of one embodiment is that the jack apparatus when not being used to stretch the flexible material of the frame assembly taut, can also be used to secure the upper frame member to the lower frame member in the lowered position.

These and various other apparatus and features of novelty which characterize the present invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figures 1, 2, 4, 6:
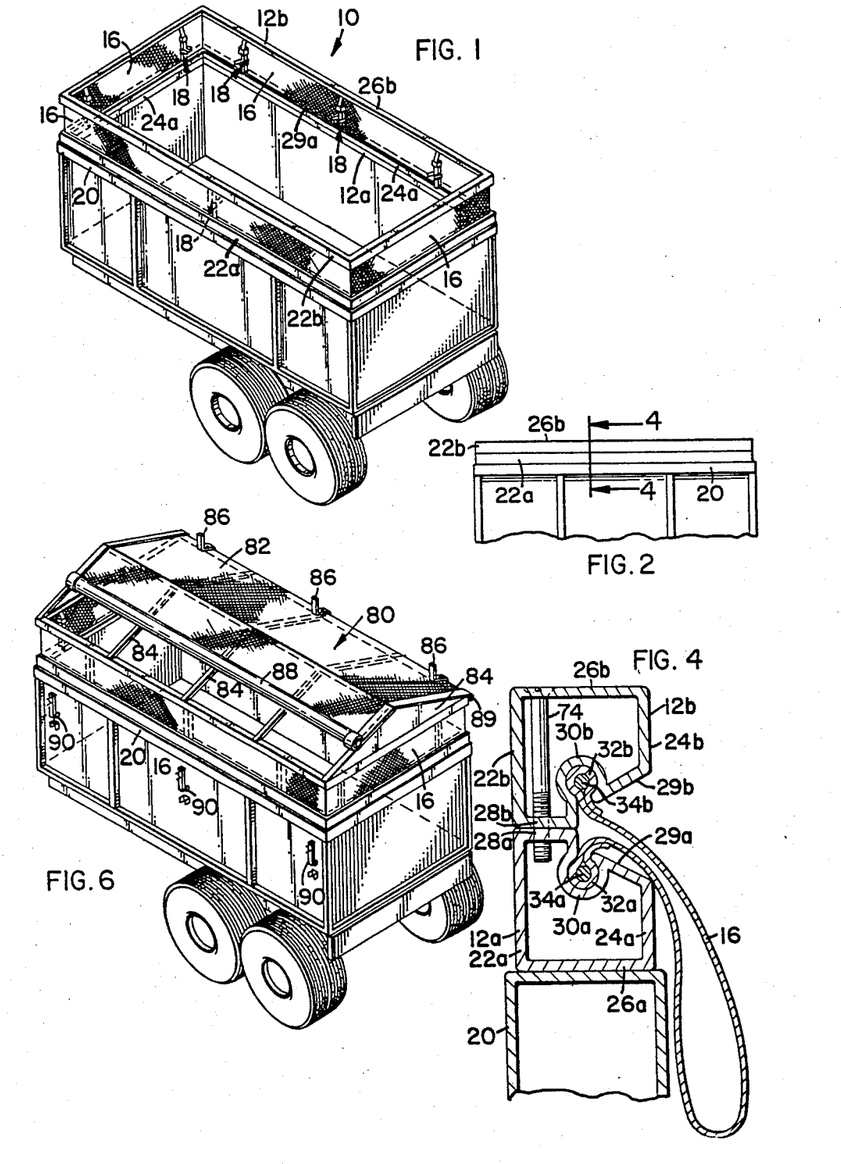
FIG. 1 is a view in perspective of an embodiment of the present invention in a raised position.
FIG. 2 is a fragmentary side elevational view of an embodiment of the present invention in a lowered position.
FIG. 4 is a cross-sectional view along line 4—4 of FIG. 2 of the present invention.
FIG. 6 is a perspective view of an embodiment of the present invention utilized with a roll-up tarp apparatus.

Referring now to the drawings, there is shown in FIG. 1 a first preferred embodiment of an extension apparatus embodying the principles of the present invention, generally referred to by reference numeral 10, which is mounted on top of sidewalls 20 of a truck box or cargo bed area. It will be appreciated that while the following detailed description discusses the application of the present invention to the cargo box of a truck, the present invention will have utility in varying applications.

The present invention is adjustable between raised (see FIG. 1) and lowered (see FIG. 2) positions. As illustrated in FIG. 1, the present invention includes lower and upper frame members 12a, 12b interconnected by a flexible planar member 16 which, in some applications, might be a flexible fabric-like material. Horizontally spaced apart jack apparatus 18 releasably interconnected to the lower end upper frame members 12a, 12b are utilized to raise the extension apparatus into an extended or raised position. Once in the raised position, the jack apparatus 18 assists in retaining the extension apparatus 10 in the raised position. In FIG. 2, the present invention is shown in the lowered position with the jack apparatus 18 removed therefrom.

More particularly, as illustrated in FIG. 4, the lower and upper frame members 12a, 12b include hollow generally five-sided polygonal-shaped structures having roughly parallel vertical sides 22a, b and 24a, b, respectively and horizontal bottom and top surfaces 26a, b respectively. The opposing or facing surfaces of each of the members 12a, 12b have first and second portions 28a, b and 29a, b respectively. Surfaces 28a, b are generally horizontal such that when the present invention is in the lowered position as illustrated in FIG. 4, surface 28b rests on surface 28a. The surfaces 29a, b interconnect surfaces 28a, b and 24a, b and are oblique with respect to the surfaces 28a, b and 24a, b, thereby defining a wedge or gap between frame members 12a, 12b adjacent the surfaces 29a, b when the present invention is in the lowered position.

The oblique surfaces 29a, b define arcuately shaped channels 30a, b extending longitudinally of frame members 12a, 12b. The channels 30a, b define a cavity having a somewhat restricted opening to the surfaces 29a, b. The restricted openings are generally vertically directed and aligned vertically opposite each other. The frame members 12a, 12b are beveled and interconnected at the corners of the extension apparatus 10 so as to define continuous channels extending longitudinally about the frame members 12a, 12b.

Figures 3, 5, 7:
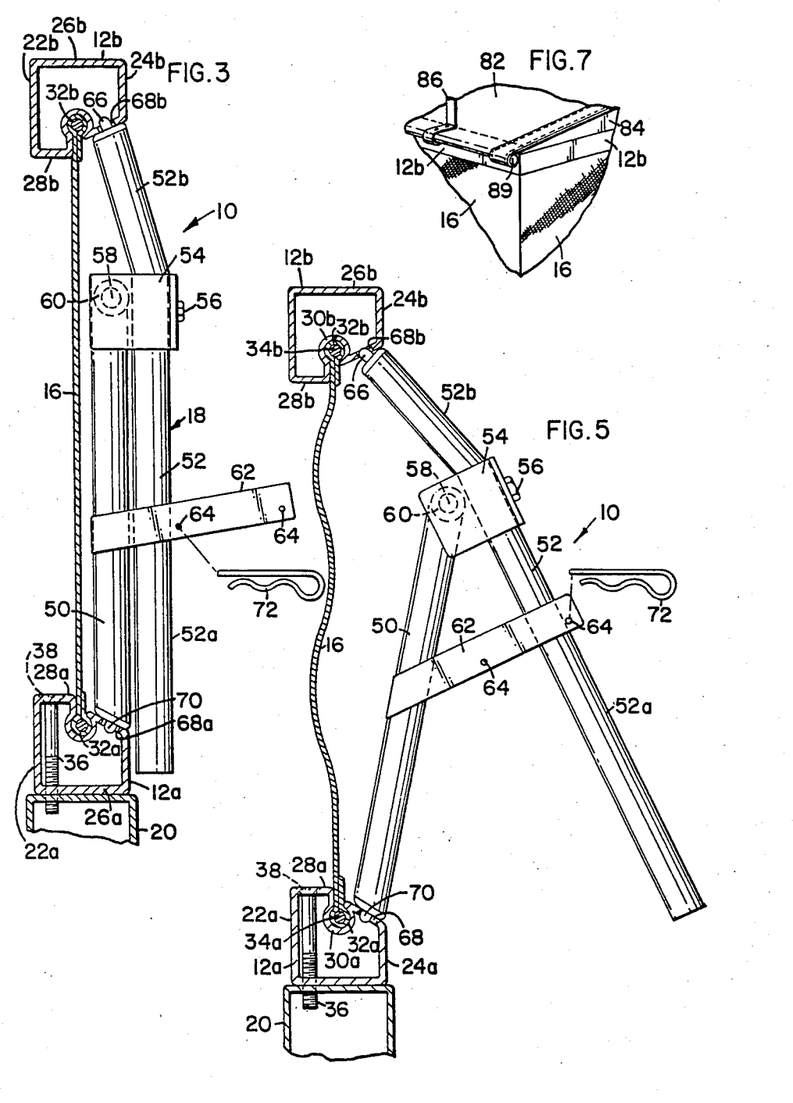
FIG. 3 is an elevational view of an embodiment a jack apparatus of the present invention.
FIG. 5 is an elevational view of an embodiment of a jack apparatus of the present invention partially extended.
FIG. 7 is an enlarged fragmentary view of the embodiment shown in FIG. 6.

As illustrated in FIGS. 3 and 4, the flexible member 16 has a hem-like portion 32a, b extending along the lower and upper edges thereof. Each of the hems 32a, b has a flexible, arcuately shaped member such as a rope 34a, b, respectively which is sewn or suitably attached therein such that the hem 32a, b which are constructed and arranged such that the restriction portion thereof retains the hem portions 32a, b in the channel portions 30a, b. The hem portions 32a, b might be formed by sewing the edges of the flexible member 16 or by any other suitable method. The flexible member 16, due to its slidable mounting in the channel portions 30a, b is horizontally stretched or tightened so as to have uniform horizontal tension throughout. Furthermore, when the frame assembly is extended into the raised position, the flexible member 16 is positioned in a generally vertical plane and has generally uniform vertical tension throughout.

As illustrated in FIG. 3, the lower frame member 12a is suitably fastened to the top of the sidewalls 20 so as to retain the extension apparatus 10 on the sidewalls 20. In the embodiment shown, a bolt-like member 36, having a head portion 38, is inserted through vertically aligned apertures in the surfaces 28a and 26a of the frame member 12a and threaded into the top of the sidewall 20 or suitably attached thereto. The aperture in the surface 26a is constructed and arranged such that the head portion 38 of the bolt-like member 36 is mounted in the frame member 12a so as to be flush with the surface 28a thereof. Consequently, the bolt-like member 36 does not prevent the upper member 12b from resting on the lower frame member 12a in the lowered position. As illustrated in FIG. 4, the flexible member 16 typically folds and hangs on the inside of the cargo bed area when the extension apparatus 10 is in the lowered position. The flexible member 16 extends from the channel portions 30a, b through the gap between the surfaces 29a, b and into the cargo bed area.

As illustrated in FIGS. 1 and 3, when in the raised position, the flexible member 16 of the extension apparatus 10 is stretched tightly between the lower and upper frame memberes 12a, b so as to have relatively uniform vertical tension throughout. As illustrated in FIG. 6, the extension apparatus, due to the relatively uniform horizontal and vertical tightness of the flexible member 16, is sturdy and capable of supporting a roll-up tarp apparatus 80 which might be utilized to cover the cargo bed area.

While there are various roll-up tarp apparatus available on the market, the roll-up tarp apparatus illustrated in FIG. 6 includes a tarp 82 rolled onto a tube 88 along one edge thereof. The tarp 82 and the tube 88 are supported by spaced apart truss or beam members 84 which are in turn suitably secured to the upper frame member 12b. The beam members 84 span from the upper frame member 12b on one side of the cargo bed to the upper frame member 12b on the other side of the cargo bed thereby providing a frame work over which the tarp can be positioned. The tarp 82 is illustrated in FIG. 7 as being fastened to the upper frame member 12b along one side of the cargo bed by a clamp apparatus 86 which includes an arcuate portion for retaining a hem portion of the tarp which has an elongated member 89 inserted therein and a portion projecting above the surface of the tarp 82 so as to retain the roll of tarp on top of the cargo bed when the tarp is in the stored, rolled-up position. To use the tarp, the tarp 82 is rolled across the beam members 84 by attaching a crank handle to a universal joint at the back end of the tube 88 and consequently rotating the handle. The tarp 82 is then held in the end closed position by hold down straps suitably fastened to the side of the cargo bed by hold down clamp apparatus 90. It will be appreciated that the present invention might be utilized with other variations of roll-up tarp apparatus and that the particular configuration shown is merely exemplary of the present invention's utility with roll-up tarp apparatus.

In addition, the present invention will resist any wind resistance imparted thereon by the moving vehicle. Furthermore, the present invention is sufficiently sturdy to oppose any forces exerted thereon by typical cargo loads.

The extension apparatus 10 of the present invention is raised into the raised position by the horizontally spaced apart jack-like extender apparatus 18 illustrated in FIGS. 3 and 5. The jack apparatus 18 includes two elongated members 50 and 52 operatively connected to each other. In one embodiment, one inch square tubing is utilized to form members 50 and 52. The member 52 includes a first relatively straight portion 52a and a second relatively straight portion 52b which is oblique with respect to the first portion 52a. The member 50 is slidably attached to the member 52 by a generally U-shaped bracket 54. The bracket 54 includes a set screw 56 or the like for releasably attaching the bracket 54 to the straight portion 52a of the elongated member 52 such that the bracket 54 is mounted for adjustable movement along the straight portion 52a of the member 52.

The top end of the elongated member 52 includes an extension 66 adapted for releasable reception in an aperture 68b defined by the surface 29b adjacent the channel portion 30b. The elongated member 50 includes an extension 70 at the lower end thereof adapted for releasable reception in an aperture 68a defined by the surface 29a adjacent channel portion 30a.

The member 50 is pivotally attached opposite the upper end thereof to the bracket 54 by a pivot shaft 58 and bushing 60 combination thereby enabling member 50 to be pivoted away and toward leverage handle portion 52a. Furthermore, member 50 is interconnected at a location between its upper and lower ends to the member 52 along straight portion 52a by a pair of elongated members 62 which define apertures 64 therein. In the preferred embodiment shown, each of the interconnecting members 62 defines two spaced apart apertures 64 which are aligned with those on the other member 62.

Consequently, to raise the extension apparatus 10 of the present invention, it will be appreciated that the upper frame member 12b is manually raised by hand to a height above the lower frame member 12a such that the extensions 70 and 66 of the jack apparatus 18 can be inserted into the apertures 68a, b, respectively, of the frame members 12a, b. The handle portion 52a of the jack apparatus 18 is then forced downwardly toward the elongated member 50 and flexible member 16 so as to function as a leverage arm thereby causing the elongated members 50, 52 to pivot about the pivot shaft 58 which results in the ends of the jack apparatus, including extensions 66 and 70, moving farther apart and raising extension apparatus 10. As the jack apparatus pivots, it moves in closer to the flexible member 16. As illustrated in FIG. 5, the jack apparatus 18 may be locked by a lock pin 72 in a partially extended position or locked in a fully extended position as illustrated in FIG. 3.

The adjustable bracket 54 enables variable adjustment in the amount of spacing between the lower and upper frame members 12a, b when in the raised position which correspondingly varies the tightness of the flexible members 16.

When in the stored lowered position, the upper frame member 12b is suitably attached to the lower frame member 12a so as to be retained on the truck walls. As illustrated in FIG. 4, the upper frame member 12b might be attached to the lower frame member 12a by spaced apart bolt-like members 74 or the like. It will be appreciated that other methods of attaching the upper frame member to the lower frame member might be utilized.

The present invention is assembled by welding or fastening by other suitable methods, the lower and upper frame members 12a, b together at their corners to form the rectangular configuration required to fit on top of the cargo area sidewalls 20. The flexible member 16 is then inserted into the continuous channel portions 30a, b. This can be accomplished by varying methods. In one method, one of the corners is left unattached until the flexible member 16 is inserted into the channel portions 30a, b. In another method, an access groove or channel is formed transversely in the frame members 12a, b so as to provide access to the channel portions 30a, b thereby enabling the flexible member 16 to be inserted into the channel portions 30a, b after the frame work has been assembled.

After the flexible member 16 is positioned in the channel 30a, b, it is pulled tight so as to have uniform force on the tension throughout. This is made possible by the slidable mounting of the flexible member 16 in the channels 30a, b of the frame members 12a, b. After being suitably tightened, the loose ends of the flexible member 16 are suitably fastened to one another. This might be accomplished by gluing the ends of the flexible member, by a welding process, etc.

After having assembled the extension apparatus 10, it is next fastened to the top of the sidewalls 20 of the cargo bed area by spaced apart bolt-like members 36 as illustrated in FIG. 3 or any other suitable methods in keeping with the principles of the present invention.

To raise the extension apparatus 10 into the raised position, one of the jack apparatus 18 might be positioned in the apertures 68a, b near one end of the frame members 12a, b. The jack apparatus 18 is then placed in a partially extended position as illustrated in FIG. 5 and the lock pin 72 attached to retain the jacks apparatus 18 in the partially extended position. The other end of the frame member 12a, b is then similarly raised by the use of one of the jack apparatus 18. The frame members 12a, b can then be fully extended into the raised position by a similar process and the jack apparatus 18 locked into position by the lock pin 72. Thus, the present invention provides for the raising or extending of the extension apparatus 10 without necessitating the simultaneous extension or raising of the entire frame assembly. This provides for easier operation and more uniform vertical tension in the flexible member 16.

Yet another embodiment of the present invention is shown in FIGS. 8-15, the embodiment being generally designated by the reference numeral 110. This embodiment has a frame assembly 111 having raised and lowered positions as generally illustrated in FIGS. 8-15. As illustrated in FIGS. 8-11, this embodiment includes lower and upper frame members 112a, 112b similar to that of the previous embodiment interconnected by a flexible planar member 116 which, as with the previous embodiment, might be a flexible fabric-like material. Horizontally spaced apart jack apparatus 118 are utilized to fully raise the extension apparatus 110 into the raised position and stretch the fabric-like material 116 into a taut condition. Once in the raised position, the jack apparatus 118 assists in retaining the extension apparatus 110 in that position.

Figure 9:
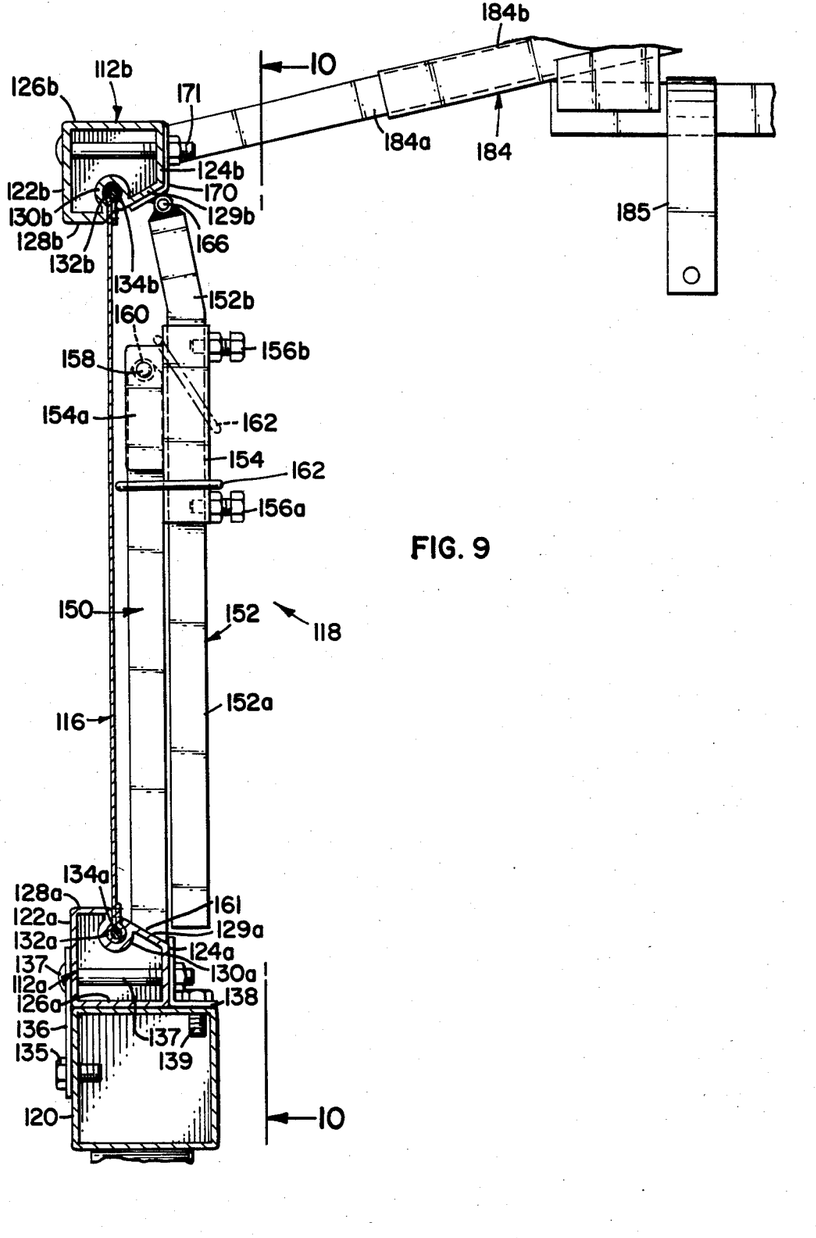
FIG. 9 is an enlarged sectional view as seen generally along line 9—9 of FIG. 8.
Figure 10:
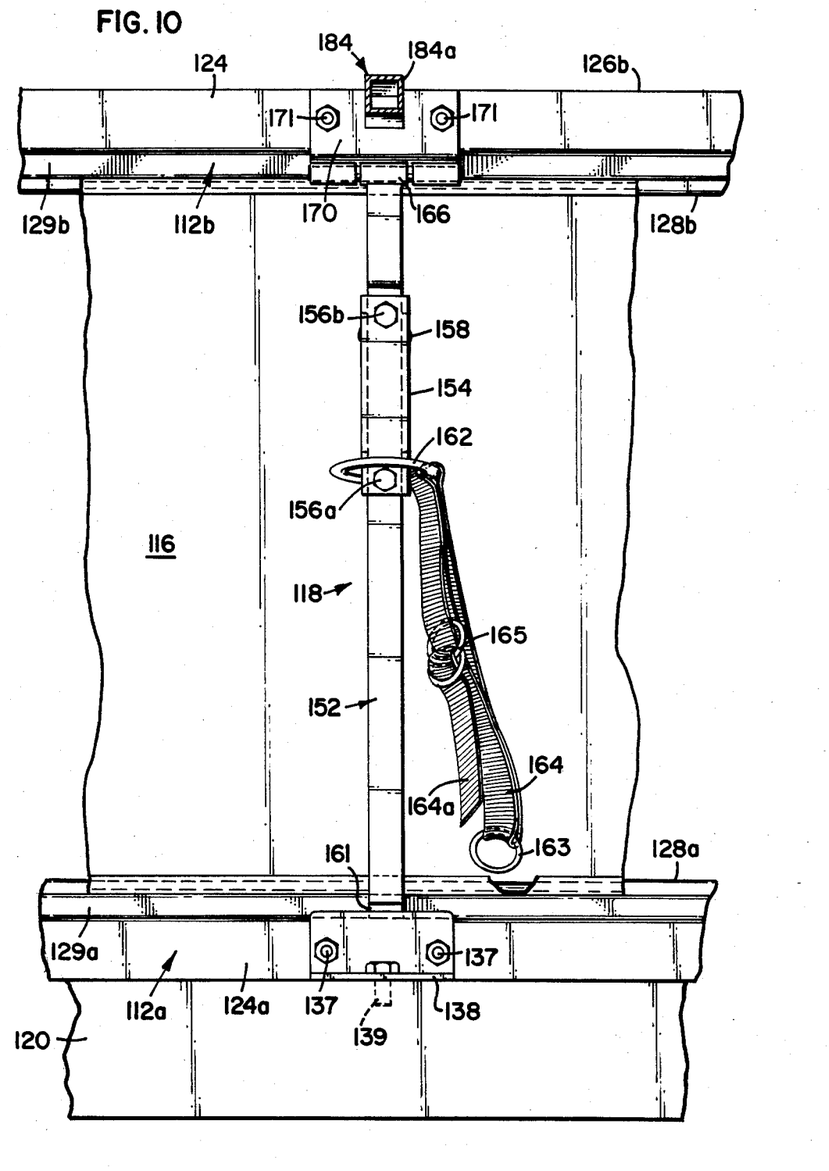
FIG. 10 is an enlarged sectional view as seen generally along line 10—10 in FIG. 9.
Figure 11:
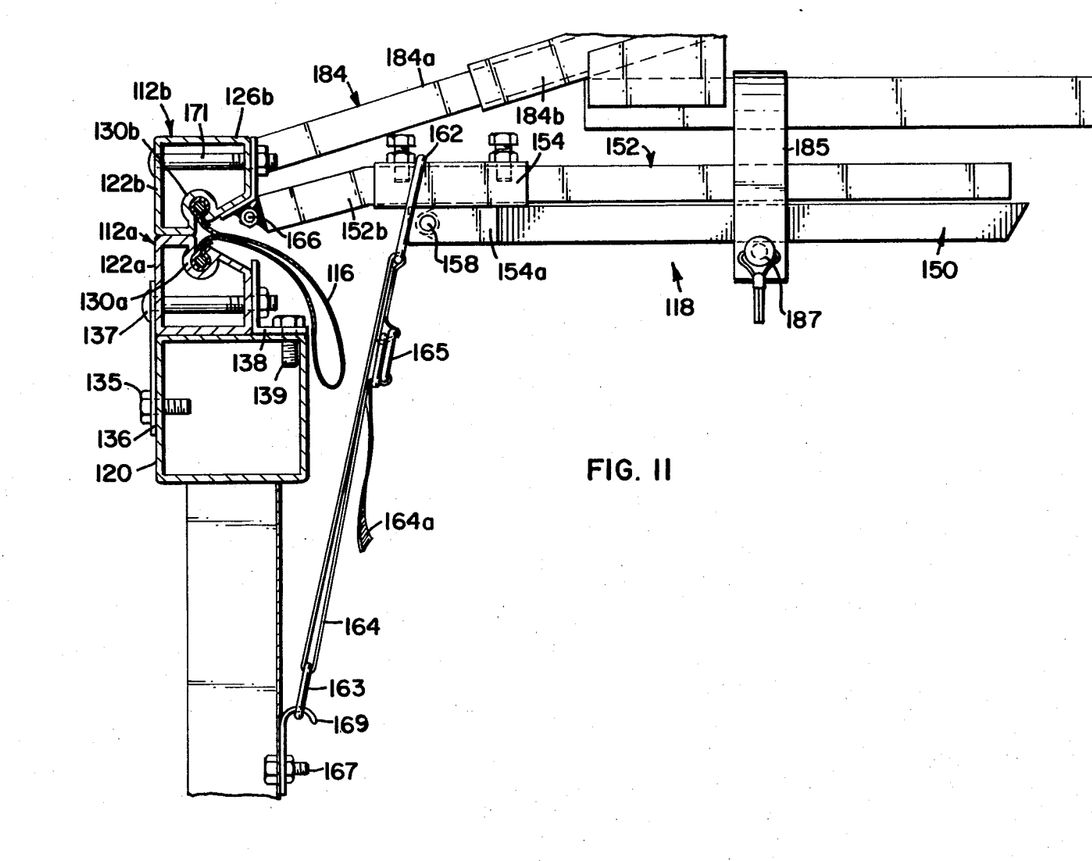
FIG. 11 is an enlarged partial sectional view similar to FIG. 9 illustrating the embodiment in the lowered position.
Figure 12:
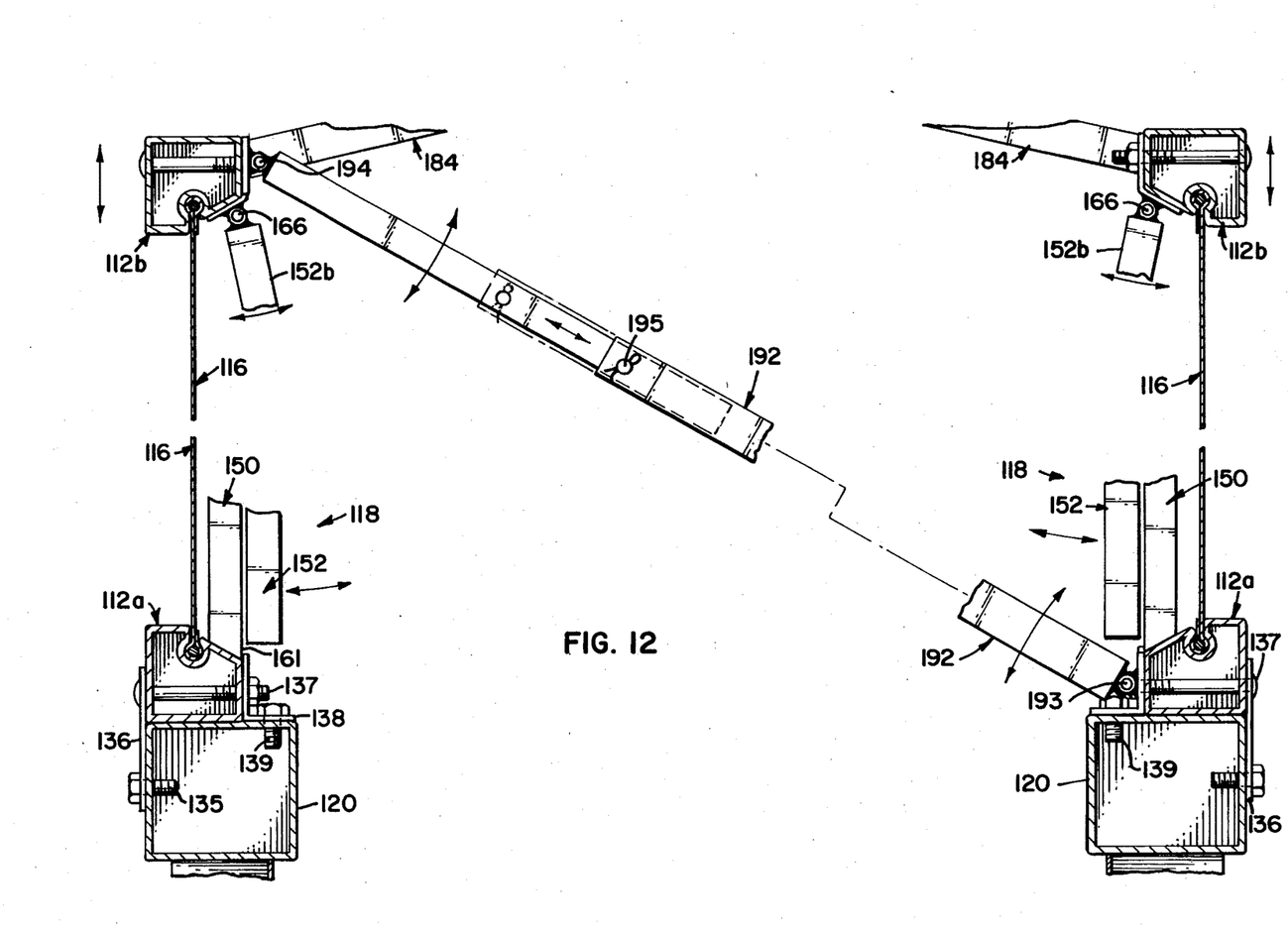
FIG. 12 is enlarged fragmentary sectional view as seen generally along line 12—12 of FIG. 8.

More particularly, as illustrated in FIGS. 9-11, the lower and upper frame members 112a, 112b are similar to the frame members of the previous embodiment. Frame members 112a, 112b include hollow, generally five-sided polygonal shaped structures having roughly parallel vertical sides 122a, b and 124a, b, respectively, and horizontal bottom and top surfaces 126a, b, respectively. The opposing or facing surfaces of each of the lower and upper frame members 112a, 112b have first and second surfaces 128a, b and 129a, b, respectively. The surfaces 128a, b are generally horizontal such that when the present invention is in the lowered position as illustrated in FIG. 11, the surface 128b rests on the surface 128a. The surfaces 129a, b interconnect the surfaces 128a, b and 124a, b and are oblique with respect to each of the surfaces 128a, b and 124a, b, thereby defining a wedge or gap between the frame members 112a, b adjacent the surfaces 129a, b when the frame assembly is in the lowered position.

The oblique surfaces 129a, b define arcuately shaped channels 130a, b extending longitudinally of the frame members 112a, b. The channels 130a, b define a cavity having a somewhat restricted opening to the surfaces 129a, b. The restricted openings are generally vertically directed and aligned vertically opposite each other. The frame members 112a, b, as with the previous embodiment, are beveled and interconnected at the corners of the extension apparatus 110 so as to define continuous channels extending longitudinally about the frame members 112a, b.

As illustrated in FIGS. 9-11, the flexible member 116 has hem like portions 132a, b extending along the lower and upper edges thereof. Each of the hem like portions 132a, b has a flexible, arcuately shaped member such as a rope 134a, b, respectively, which is sewn or suitably attached therein such that the hem portions 132a, b are adapted for slidable mounting in the channel portions 130a, b, which are constructed and arranged such that the restriction portion thereof retains the hem portions 132a, b in the channel portions 130a, b. The hem portions 132a, b are similar to that of the previous embodiment and enable the flexible member 116 to be horizontally stretched or tightened so as to have uniform horizontal tension throughout. Furthermore, when the frame assembly is extended into the raised position, the flexible member 116 is positioned in a generally vertical plane and has uniform vertical tension throughout. As illustrated in FIG. 9, the lower frame member 112a is suitably fastened to the top of the sidewalls 120 so as to retain the extension apparatus 110 on the sidewalls 120. The lower frame member 112a might be fastened in a manner similar to the previous embodiment or as shown, the lower member 112a might be fastened utilizing cooperating brackets 136 and 138 positioned on either side of the lower frame member 112a. The bracket 136 is a relatively flat member which interconnects the lower frame member 112a to the sidewall 120 and is suitably secured by bolt-like members 135 and 137. The L-shaped bracket 138 is suitably affixed to the lower frame member 112a by the bolt-like member 137 and to the sidewall 120 by bolt-like member 139. The L-shaped bracket 138 is positioned on a ledge of the sidewall 120 which is created due to the fact that the lower frame member 112a is somewhat narrower than the sidewall 120. The L-shaped bracket in turn rests against surface 124a of the lower frame member 112a.

Extending transversely of the cargo bed area and interconnecting the upper frame members 112b are a plurality of spaced truss beam members 184 and extending longitudinally is a member 183 interconnecting the upper frame members 112b at the ends of the extension apparatus. Preferably, the truss beam members 184 are telescoping, including a portion 184a slidably mounted in a member 184b. Although, not shown, suitable means can be utilized to longitudinally fix the portion 184a within the portion 184b; for example, extending a bolt through aligned apertures in the members 184a, b. Furthermore, in the embodiment shown in FIG. 8 and as shown in further detail in FIG. 12, at least one telescoping, stablizing bar member 192 extends between one of the lower frame members 112a along one side of the cargo bed and the upper frame member 112b extending along the opposite side of the cargo bed area. The stabilizing bar member 192 is pivotally interconnected at locations 193 and 194 to the lower and upper frame members 112a, b, respectively. Additionally, a pin 195 is utilized to retain the stabilizing bar member 192 in one of two extended configurations such that the stabilizing bar member 192 is used in both of the raised and lowered positions of the extension apparatus. Accordingly, the stabilizing bar member 192 prevents sway of the upper frame member 112b when the frame assembly is in the raised position and further holds the upper frame member 112b in vertical alignment with the lower frame member 112a in either the raised or the lowered position.

Figure 13:
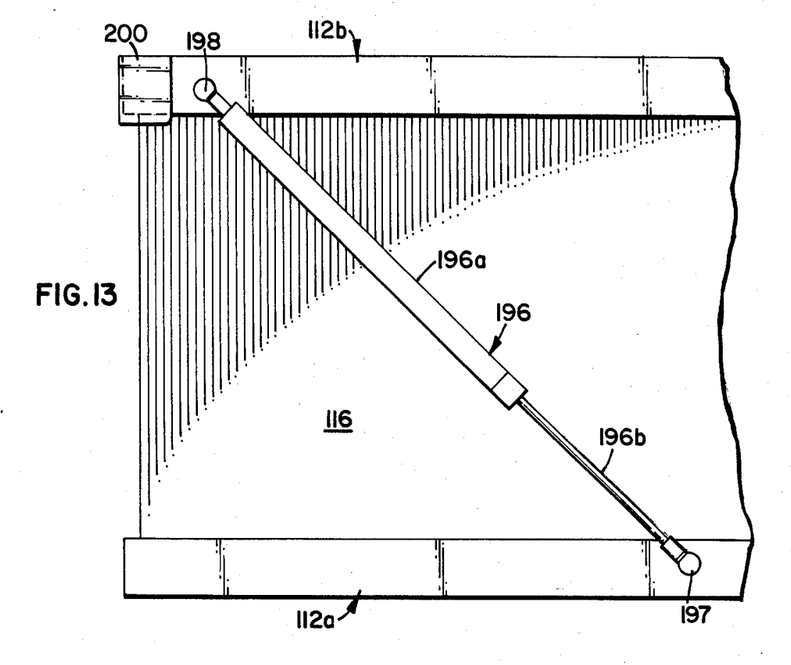
FIGS. 13 and 14 are enlarged end elevational views illustrating a telescoping actuator member of the embodiment illustrated in FIG. 8 when the extension apparatus is in a raised position and in a lowered position, respectively.
Figure 14:
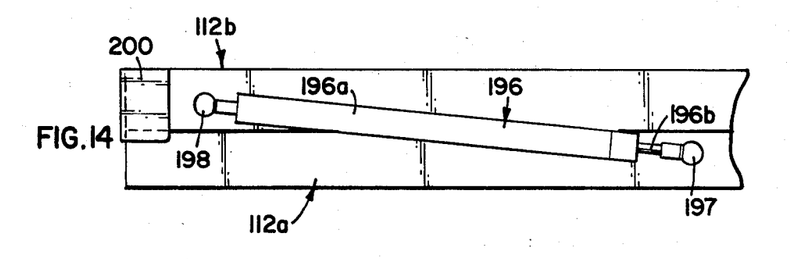

As illustrated in FIGS. 13 and 14, a corner bracket 200 is attached to the upper frame member 112b at each of the corners so as to project slightly below the upper frame member 112b. The brackets 200 assist in squaring up the extension apparatus and holding the upper and lower frame members 112a, b in place when in the lowered position.

Figure 8:
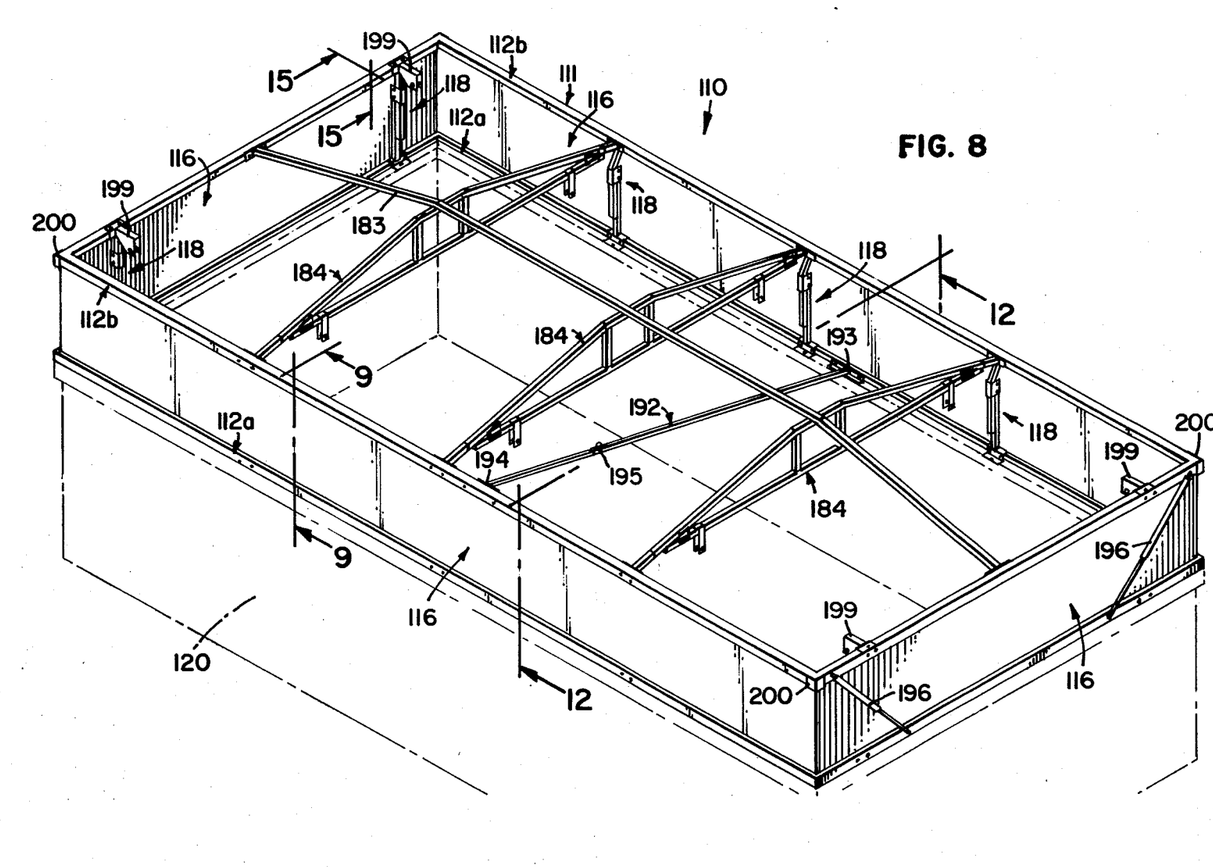
FIG. 8 is a view in perspective of yet another embodiment of the present invention in a raised position.

Additionally, in the embodiment shown in FIG. 8 and as further illustrated in FIGS. 13 and 14, pressurized gas spring actuators 196, which are continuously exerting a force, are positioned at both ends of the extension apparatus 110. The pressurized gas spring actuator 196, which include a cylinder portion 196a and a piston portion 196b, are pivotally interconnected to the lower and upper frame members 112a, b, respectively at 197 and 198. The gas spring actuators 196 are utilized in pairs and are pivotally interconnected to the lower and upper frame members 112a, b so as to effectively counter-balance or nullify one another in the lowered position. However, as the extension apparatus is slightly raised, the gas spring actuators 196 will cooperate to exert an upward force on the upper frame member 112b and thereby aid in the raising of the upper frame member 112b. Furthermore, the gas springs 196 also function to retain the upper frame member 112b in a partially raised position such that the jack apparatus 118 can be inserted between the lower and upper frame members 112a, b. Preferably the cylinder portion 196a of the gas spring actuators 196 are located proximate the upper frame member 112b.

The extension apparatus 110 of the present invention is fully extended into the raised position by the horizontally spaced apart jack apparatus 118 illustrated in FIGS. 9–11. The jack apparatus 118 each include two elongated members 150 and 152 operatively interconnected to each other. The elongated member 152 includes a first relatively straight portion 152a and a second relatively straight portion 152b which is oblique with respect to the first portion 152a. The elongated member 150 is fixedly attached to the member 152 by a bracket 154 which in turn is fixedly secured to the elongated member 152 by bolts 156a, b. It will be appreciated that the bracket 154 can be mounted at varying locations along the straight portion 152a of the elongated member 152. However, preferably, this location will be selected during the assembly process and will not be varied during use.

The top end of the elongated member 152 is pivotally interconnected to the oblique surface 129b of the upper frame member 112b for pivotal movement about a substantially horizontal axis parallel to the upper frame member 112b by a suitable pivotal mounting 166. As illustrated in FIG. 9, in the embodiment shown, the pivotal mounting will be formed by a bracket 170 secured to the upper frame member 112b by a bolt 171.

The elongated member 150 s pivotally attached proximate the upper end thereof to the bracket 154 for pivotal movement about a substantially horizontal axis parallel to the flexible member 116 by a pivot shaft 158 and bushing 160 combination mounted in a U-shaped portion 154a of the bracket 154 whose open side faces the flexible material 116. Accordingly, the handle portion 152a of the elongated member 152 can be pivoted away and toward the member 150. The lower end 161 of the elongated member 150 is oblique so as to be generally parallel to the oblique surface 129a of the lower frame member 112a when the elongated member 150 is in an upright vertical position as illustrated generally in FIG. 9. Further, as illustrated in FIG. 9, the bracket 138 projects above the surface 129a so as to retain the lower end 161 of the elongated member 150 in position. In addition, as further illustrated in FIG. 9, the handle portion 152a of the elongated member 152 is somewhat shorter so as to not extend as far downward as the end 161 of the elongated member 150. Accordingly, the bracket 138 will not interfere with the pivotal movement of the handle portion 152a of the elongated member 152 in toward the elongated member 150. As illustrated in FIGS. 9 and 10, when in the fully extended position, a lock ring 162 locks the elongated members 150 and 152 in position relative to one another, thereby preventing accidental collapse of the extension apparatus 110.

As further illustrated in FIG. 11, when the extension apparatus is in a lowered position, the jack apparatus 118 serves as a hold down function. In the lowered position, the jack apparatus 118 is pivoted upwardly and supported by a bracket 185 to a horizontal member 184a of the truss brace framework 184. The bracket 185 might include a pin 187 or the like to securedly retain the jack apparatus 118. Attached to the lock ring 162 is a webbed strap 164 and ring buckle arrangement 165. A hold down ring 163 is attached to the lower end of the hold down strap 164 and is retained by a hold down hook 169 securely fastened to the inside wall of the sidewall 120 by a bolt 167 or the like. By pulling down on the loose end 164a of the hold down strap 164, one can securedly retain the extension apparatus 110 in the lowered position.

Figure 15:
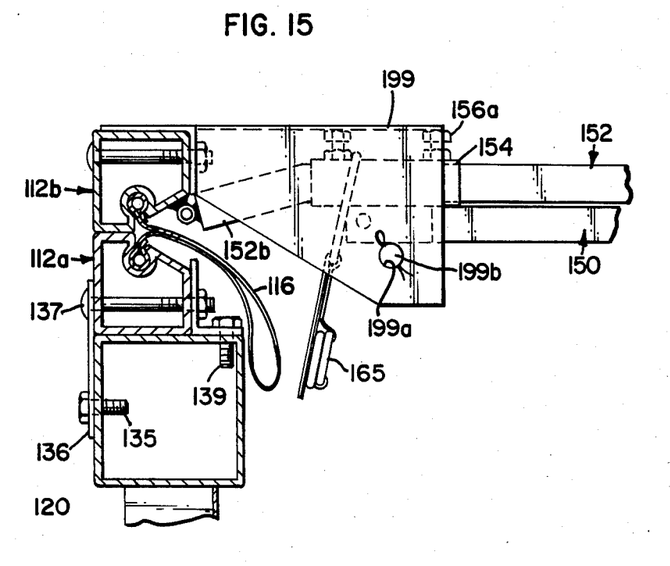
FIG. 15 is an enlarged partial sectional view taken generally along the lines 15—15 of FIG. 8 illustrating an embodiment of a jack apparatus at the front and back ends of the extension apparatus.

As illustrated in FIG. 15, a bracket member 199 having a U-shaped cross section and attached to the upper frame member 112b is used to support the jack apparatus 118 at the front and back ends of the extension apparatus when the extension apparatus is in the lowered position. The bracket member 199 includes aligned apertures 199a through which a pin 199b is inserted for retaining the jack apparatus 188.

To raise the extension apparatus 110 into the raised position, the user removes the jack apparatus 118 from the brackets 185 and releases the hold down straps 164 from the hold down hooks 169. The user then manually forces upward on the upper frame member 112b at the ends of the extension apparatus which activates the gas spring actuators 196 at the ends of the extension apparatus 110. The gas spring actuators 196 retain the frame assembly 111 in a partially raised condition. The lower ends 161 of the elongated members 150 of the jack apparatus 118 are then individually positioned on the oblique surface 129a of the lower frame member 112a. The usere then forces the handle 152a of each of the elongated members 152 toward the flexible member 116. Once the extension apparatus is fully extended and the flexible member 116 taut, the lock rings 162 are slipped down over both of the elongated members 150 and 152 to securedly lock the same in position. As illustrated in FIG. 10, the webbed straps 164 are left hanging on the inside of the cargo bed area so as to be readily available for use when the extension apparatus is lowered.

It is to be understood, that even though numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the terms in which the appended claims are expressed.

What is claimed is:

1. An extension apparatus adaptable for mounting on the sidewalls of a vehicle's cargo bed area for increasing the volume thereof, the extension apparatus comprising:
   (a) a frame assembly including an upper frame member and a lower frame member, said lower frame member being attached proximate the top of the cargo bed sidewalls, said frame assembly having a lowered position and a raised position, said upper frame member resting on said lower frame member in said lowered position, said upper frame member being vertically spaced apart from said lower frame member in said raised position, said upper and lower frame members each having a channel extending longitudinally thereof;
   (b) actuator means interconnecting said upper and lower frame members for aiding in raising said frame assembly into said raised position, said actuator means being arranged as a pair, individual ones of said actuator means of the pair substantially conterbalancing each other when the frame assembly is in the lowered position whereby a vertical force exerted by the pair of actuator means is substantially nullified when the frame assembly is in the lowered position;
   (c) a flexible material having lower and upper edges slidably mounted in said channels of said lower and upper frame members for longitudinal movement along said lower and upper frame members, said flexible material being in a slack condition when said frame assembly is in said lowered position and being in a taut condition when said frame assembly is in said raised position, said flexible material having a first side facing the cargo bed area and a second side facing away from the cargo bed area;
   (d) a plurality of horizontally spaced apart jack means positioned on said first side of said flexible material and cooperating with said upper and lower frame members for stretching said flexible material into said taut condition, said jack means including a first elongated member having upper and lower ends and a second elongated member having upper and lower ends, said first elongated member being interconnected proximate said upper end to said upper frame member for pivotal motion about a horizontal axis, said second elongated member being pivotally interconnected proximate said upper end to said first elongated member intermediate of said upper and lower ends of said first elongated member for pivotal movement of said first elongated member about a substantially horizontal axis extending substantially parallel to said flexible material;
   (e) means for removably retaining said lower end of said second elongated member proximate said lower frame member when said frame assembly is in said raised position, said first and second elongated members cooperating such that by forcing said lower end of said first elongated member downwardly and toward said flexible material, said upper frame member is caused to raise and said flexible material is stretched into a taut condition; and
   (f) an elongated stabilizing bar member extending transversely of a cargo bed area, said elongated stabilizing bar member interconnecting said upper frame member along one side of the cargo bed area to said lower frame member along an opposite side of the cargo bed area.

2. An apparatus in accordance with claim 1, further including a plurality of truss members extending transversely of the cargo bed area and interconnecting said upper frame members on opposite sides of the cargo bed area.

3. An apparatus in accordance with claim 2, further including an elongated member extending longitudinally of the cargo bed area and interconnecting said upper frame members at opposite ends of the cargo bed area.

4. An apparatus in accordance with claim 2, including a lock ring means encircling said first and second elongated members for retaining said first and second elongated members in proximate position when said fabric is in the taut condition.

5. An apparatus in accordance with claim 4, wherein said first and second elongated members are pivoted upwardly and secured to one of said truss members when the extension apparatus is in said lowered position, said lock ring means encircling at least one of said first and second elongated members and being interconnected to restraining means on the side wall of the cargo bed area.

6. An apparatus in accordance with claim 1, wherein said actuator means includes pressurized gas spring actuators interconnecting said upper and lower frame members.

7. An extension apparatus adaptable for mounting on the sidewalls of a vehicle's cargo bed area for increasing the volume thereof, the extension apparatus comprising:
(a) a frame assembly including an upper frame member and a lower frame member, said lower frame member being attached proximate the top of the cargo bed sidewalls, said frame assembly having a lowered position and a raised position, said upper frame member resting on said lower frame member in said lowered position, said upper frame member being vertically spaced apart from said lower frame member in said raised position, said upper and lowere frame members each having a channel extending longitudinally thereof;
(b) truss means extending transversely of the cargo bed area, said truss means interconnecting said upper frame members along opposite sides of the cargo bed area;
(c) a flexible material having lower and upper edges slidably mounted in said channels of said lower and upper frame members for longitudinal movement along said lower and upper frame members, said flexible material being in a slack condition when said frame assembly is in said lowered position and being in a taut condition when said frame assembly is in said raised position, said flexible material having a first side facing the cargo bed area and a second side facing away from the cargo bed area; and
(d) a plurality of horizontally spaced apart jack means positioned on said first side of said flexible material and being pivotally interconnected proximate said upper frame member for pivotal motion between a first substantially horizontal position and a second substantially vertical position, said jack means supporting said upper frame member and stretching said flexible fabric into said taut condition when in said second substantially vertical position, said truss means including bracket means intermediate of said upper frame members for retaining said jack means in said first substantially horizontal position, whereby when said frame assembly is lowered into the lowered position, said jack means can be retained with said frame assembly, said jack means including a bottom end portion removably retained proximate said lower frame member when in said second substantially vertical position, said jack means including a first elongated member having upper and lower ends and a second elongated member having upper and lower ends, said first elongated member being interconnected proximate said upper end to said upper frame member for pivotal motion about a horizontal axis, said second elongated member being pivotally interconnected proximate said upper end to said first elongated member intermediate of said upper and lower ends of said first elongated member for pivotal movement of said first elongated member about a substantially horizontal axis extending substantially parallel to said flexible material.

8. An extension apparatus adaptable for mounting on the sidewalls of a vehicle's cargo bed area for increasing the volume thereof, the extension apparatus comprising:
(a) a frame assembly including an upper frame member and a lower frame member, said lower frame member being attached proximate the top of the cargo bed sidewalls, said frame assembly having a lowered position and a raised position, said upper frame member resting on said lower frame member in said lowered position, said upper frame member being vertically spaced apart from said lower frame member in said raised position, said upper and lower frame members each having a channel extending longitudinally thereof;
(b) actuator means interconnecting said upper and lower frame members for aiding in raising said frame assembly into said raised position;
(c) a flexible material having lower and upper edges slidably mounted in said channels of said lower and upper frame members for longitudinal movement within said lower and upper frame members, said flexible material being in a slack condition when said frame assembly is in said lowered position and being in a taut condition when said frame assembly is in said raised position, said flexible material having a first side facing the cargo bed area and a second side facing away from the cargo bed area; and
(d) a plurality of horizontally spaced apart jack means positioned on said first side of said flexible material and cooperating with said upper and lower frame members for stretching said flexible material into said taut condition, said jack means including a first elongated member having upper and lower ends and a second elongated member having upper and lower ends, said first elongated member being interconnected proximate said upper end to said upper frame member for pivotal motion about a horizontal axis, said second elongated member being pivotally interconnected proximate said upper end to said first elongated member intermediate of said upper and lower ends of said first elongated member;
(e) means for removably retaining said lower end of said second elongated member proximate said lower frame member when said frame assembly is in said raised position;
(f) an elongated stabilizing bar member means extending transversely of the cargo bed area, said elongated stabilizing bar member interconnecting said upper frame member along one side of the cargo bed area to said lower frame member along an opposite side of the cargo bed area;
(g) truss members extending transversely of the cargo bed area and interconnecting said upper frame members on opposite sides of the cargo bed area; and
(h) lock ring means encircling said first and second elongated members for retaining said first and second elongated members in proximate position when said fabric is in the taut condition, said first and second elongated members being pivoted upwardly and secured to one of said truss members and said lock ring means encircling at least one of said first and second elongated members and being interconnected to restraining means on the sidewall of the cargo bed area when the extension apparatus is in said lowered position.

9. An extension apparatus adaptable for mounting on the sidewalls of a vehicle's cargo bed area for increasing the volume thereof, the extension apparatus comprising:
  (a) a frame assembly including an upper frame member and a lower frame member, said lower frame member being attached proximate the top of the cargo bed sidewalls, said frame assembly having a lowered position and a raised position, said upper frame member resting on said lower frame member in said lowered position, said upper frame member being vertically spaced apart from said lower frame member in said raised position, said upper and lower frame members each having a channel extending longitudinally thereof;
  (b) actuator means interconnecting said upper and lower frame members for aiding in raising said frame assembly into said raised portion;
  (c) a flexible material having lower and upper edges slidably mounted in said channels of said lower and upper frame members for longitudinal movement along said lower and upper frame members, said flexible material being in a slack condition when said frame assembly is in said lowered position and being in a taut condition when said frame assembly is in said raised position, said flexible material having a first side facing the cargo bed area and a second side facing away from the cargo bed area;
  (d) a plurality of horizontally spaced apart jack means positioned on said first side of said flexible material and cooperating with said upper and lower frame members for stretching said flexible material into said taut condition, said jack means including a first elongated member having upper and lower ends and a second elongated member having upper and lower ends, said first elongated member being interconnected proximate said upper end to said upper frame member for pivotal motion about a horizontal axis, said second elongated member being pivotally interconnected proximate said upper end to said first elongated member intermediate of said upper and lower ends of said first elongated member for pivotal movement of said first elongated member about a substantially horizontal axis extending substantially parallel to said flexible material;
  (e) means for removably retaining said lower end of said second elongated member proximate said lower frame member when said frame assembly is in said raised position, said first and second elongated members cooperating such that by forcing said lower end of said first elongated member downwardly and toward said flexible material, said upper frame member is caused to raise and said flexible material is stretched into a taut condition; and
  (f) an elongated stabilizing bar member extending transversely of the cargo bed area, said elongated stabilizing member interconnecting said upper frame member along one side of the cargo bed area to said lower frame member along an opposite side of the cargo bed area.

10. An extension apparatus adaptable for mounting on the sidewalls of a vehicle's cargo bed area for increasing the volume thereof, the extension apparatus comprising:
  (a) a frame assembly including an upper frame member and a lower frame member, said lower frame member being attached proximate the top of the cargo bed sidewalls, said frame assembly having a lowered position and a raised position, said upper frame member resting on said lower frame member when in said lowered position, said upper frame member being vertically spaced apart from said lower frame member in said raised position, said upper and lower frame members each having a channel extending longitudinally thereon;
  (b) a flexible material having lower and upper edges slidably mounted in said channels of said lower and upper frame members for longitudinal movement along said lower and upper frame members, said flexible material being in a slack condition when said frame assembly is in said lowered position and being in a taut condition when said frame assembly is in said raised position, said flexible material having a first side facing the cargo bed area and a second side facing away from the cargo bed area;
  (c) a plurality of horizontally spaced apart jack means having upper and lower ends and being positioned on said first side of said flexible material and cooperating with said upper and lowr frame members for stretching said flexible material into said taut condition, said jack means including a first elongated member having upper and lower ends and a second elongated member having upper and lower ends, said first elongated member being interconnected proximate said upper end to said upper frame member for pivotal motion about a horizontal axis, said second elongated member being interconnected proximate said lower end to said lower frame member, one of said upper and lower elongated members being non-destructively and removably interconnected to its respective frame member, said second elongated member being interconnected proximate said upper end to said first elongated member intermediate of said upper and lower ends of said first elongated member for pivotal movement of said first elongated member about a substantially horizontal axis, said first and second elongated members cooperating such that by forcing said lower end of said first elongated member downwardly toward said second elongated member, said upper frame member is caused to raise and said flexible material is stretched into a taut condition; and
  (d) bracket means mounted on the frame assembly intermediate of the cargo bed sidewalls for supporting said first and second elongted members in a pivoted position extending inwardly within the cargo bed area.

11. An apparatus in accordance with claim 10, wherein the bracket means is mounted on a truss structure extending transversely of the cargo bed area.

12. An apparatus in accordance with claim 10, wherein said first elongated member is pivotally interconnected at said upper end to said upper frame for pivotal motion about a horizontal axis parallel to said upper frame member to which said first elongated member is interconnected, said second elongated member being pivotally interconnected proximate said upper end to said first elongated member intermediate of said upper and lower ends of said first elongated member for pivotal movement of said first elongated member about a substantially horizontal axis parallel to said upper frame member to which said first elongated member is interconnected.

13. An apparatus in accordance with claim 10, further including actuator means interconnecting said upper and lower frame members for aiding in raising said frame assembly into said raised position, said actuator means being arranged in pairs, individual ones of said actuator means of a pair substantially counterbalancing each other when the frame assembly is in the lowered position, whereby the force exerted by the pair of actuator means is substantially nullified when the frame assembly is in the lowered position.

* * * * *